United States Patent [19]

Bedient

[11] 4,286,617
[45] Sep. 1, 1981

[54] WATER SYSTEM FREEZE PROTECTION APPARATUS

[75] Inventor: Marvin J. Bedient, Caldwell, Id.

[73] Assignee: John Swan, Bend, Oreg.

[21] Appl. No.: 10,395

[22] Filed: Feb. 8, 1979

[51] Int. Cl.³ .............................................. E03C 1/02
[52] U.S. Cl. ..................................... 137/334; 137/899
[58] Field of Search ...................... 137/334, 344, 899; 138/34

[56] References Cited

U.S. PATENT DOCUMENTS

| | | |
|---|---|---|
| 1,238,073 | 8/1917 | Hollar . |
| 1,408,749 | 3/1922 | Lamar . |
| 2,095,875 | 10/1937 | Johnson . |
| 2,670,082 | 2/1954 | Dunn et al. |
| 2,840,101 | 6/1958 | Saylor .................................. 137/335 |
| 3,384,123 | 5/1968 | Saddison . |
| 3,929,154 | 12/1975 | Goodwin . |
| 4,078,579 | 3/1978 | Bucko . |

*Primary Examiner*—Gerald A. Michalsky
*Attorney, Agent, or Firm*—Armstrong, Nikaido, Marmelstein & Kubovcik

[57] ABSTRACT

An anti-freeze apparatus for use with a recreational vehicle water system having a main water storage tank, a water pump, a hot water heater and domestic cold and hot water supply lines. The invention comprises an anti-freeze storage tank containing a supply of anti-freeze, a first valve mechanism in fluid communication with the anti-freeze storage tank and interposed between the water storage tank and the water pump and a second valve mechanism providing fluid communication between the water heater water inlet, the water heater hot water outlet and the domestic hot water line. The anti-freeze apparatus has a normal water supply state wherein the first valve mechanism permits water to flow from the storage tank to the water pump and the second valve mechanism permits pressurized storage water to flow to the water heater inlet and heated water to flow from the water heater outlet to the domestic hot water supply line; and an anti-freeze protection state, wherein the first valve mechanism prevents the flow of water from the storage tank and fluidly connects the supply of anti-freeze to the water pump, and the second valve mechanism prevents the flow of pressurized fluid to the water heater water inlet while directly connecting the pressurized storage water supply line to the domestic hot water supply line, thereby by-passing the water heater inlet, whereby anti-freeze is supplied to the entire water system except for the hot water heater and the water storage tank. The second valve mechanism will further include a check valve positioned between the water heater hot water outlet and the domestic hot water line for preventing the flow of anti-freeze into the water heater through the hot water outlet when the second valve mechanism is in the anti-freeze protection state. The first and second valve mechanisms preferably each include a three-way valve.

6 Claims, 3 Drawing Figures

WATER SYSTEM FREEZE PROTECTION APPARATUS

BACKGROUND OF THE INVENTION

1. Field of the Invention

The present invention is directed to a freeze protection system and, more specifically, to an anti-freeze system for use in recreational vehicle water systems.

2. Descripton of the Prior Art

At present, recreational vehicle owners have the choice of either storing their recreational vehicles for the entire winter season or paying a fee to a service center for winterizing their water system after each winter use. Thus, the recreational vehicle owner has only the choice of the inconvenience of being without the recreational vehicle throughout the winter months or using the recreational vehicle and subjecting themselves to the considerable expense of having the water system professionally winterized after each winter use.

More specifically, present recreational vehicle water systems do not lend to winterization by the individual owners or users. For example, one commonly used winterization procedure calls for draining the water tank and water heater, disconnecting the hot and cold water lines from the water heater, connecting the hot and cold water lines with a bypass coupling, disconnecting the water line from the water tank that goes to the water pump, placing the water line in an anti-freeze container, opening all of the water lines, running the water pump, reconnecting the water line to the water tank, removing the bypass coupling from the water lines and reconnecting the water lines to the water heater, cleaning up all spillage and checking for leaks resulting from the removal and reconnection of the various water lines. This procedure uses approximately one gallon of anti-freeze and requires about one hour of skilled labor.

Another known procedure consists of draining the water tank and water heater, disconnecting the hot and cold water lines from the water heater, connecting the hot and cold water lines with a bypass coupling, connecting an anti-freeze pump to the city water supply, opening all of the water lines, running the anti-freeze pump, removing the bypass coupling from the water lines and reconnecting the water lines to the water heater, cleaning up all spillage and checking for leaks resulting from the removal and reconnection of the various water lines. This procedure uses approximately one gallon of anti-freeze and requires approximately one hour of skilled labor.

Still another known procedure consists of draining the water tanks and water heater, disconnecting the hot and cold water lines from the water heater, connecting the hot and cold water lines with a bypass coupling, pouring from two to five gallons of anti-freeze into the water tank, opening all of the water lines, running the water pump, removing the bypass coupling from the hot and cold water lines and reconnecting the water lines to the water heater, cleaning up spillage and checking for leaks resulting from the removal and reconnection of the various water lines. This procedure uses from two to five gallons of anti-freeze and requires approximately one hour of skilled labor.

A still further known procedure consists of continuously electrically heating the water lines. This procedure is not only energy wasteful and expensive, but further, there is a risk of broken water lines in the event of a power failure.

Goodwin, U.S. Pat. No. 3,929,154 discloses a freeze protection apparatus and method for winterizing recreational vehicles. The apparatus comprises an anti-freeze storage tank and a series of five individual two-way valves interconnecting the water heater inlet and outlet, water storage tank outlet, anti-freeze storage tank outlet, and hot and cold water lines, each of which must be actuated in a complex sequence to effect freeze protection of the recreational vehicle plumbing system.

Saddison, U.S. Pat. No. 3,384,123 discloses a freeze protection system for self-service car wash units, which system prevents water from becoming frozen in conduits which are exposed to below-freezing temperature conditions. The system includes a source of anti-freeze, a compressed gas source and suitable control means for alternately supplying water to the conduit or connecting the anti-freeze and compressed gas sources to the conduit. Several modified forms of the invention are disclosed. In one form, a system includes a water supply conduit connected through a pump to a nozzle outlet used for washing cars, which nozzle is exposed to freezing air temperatures. An additional conduit is connected to the freeze-preventing apparatus at one end and to the nozzle outlet at its other end. Check valves are provided in the conduit for preventing the flow of fluid in a reverse direction. A solenoid valve is positioned in the conduit for preventing the flow of fluid in a reverse direction. A solenoid valve is positioned in the conduit for preventing the flow of anti-freeze and compressed air, except when required. A tank is provided containing compressed air and an anti-freeze solution, the tank being connected to the conduit through the solenoid valve. When a car is being washed, the pump is operating, thereby supplying water to the nozzle outlet. During this operation, the solenoid valve is closed and anti-freeze flows from the tank through a conduit to an orifice, then to a branch conduit where the anti-freeze rises to a predetermined level. A selected time after the washing cycle has ended, the solenoid valve is opened. The anti-freeze in the branch conduit under pressure of the compressed gas in the tank is forced through the solenoid valve and the conduit into the nozzle outlet. The anti-freeze liquid is immediately followed by compressed air from the tank which removes substantially all of the liquid in the conduit and the nozzle outlet.

Dunn et al, U.S. Pat. No. 2,670,082 discloses a device for preventing the icing of filters employed in the fuel line of an aircraft fuel system. The fuel system includes a boost pump for supplying fuel from a fuel tank through a discharge pipe to the inlet side of a fuel filter. An anti-freeze pump is provided for supplying anti-freeze from a storage tank through tubing into the inlet side of the fuel filter, where the anti-freeze mixes with the fuel to prevent freezing of the fuel.

Lamar, U.S. Pat. No. 1,408,740; Johnson, U.S. Pat. No. 2,095,875; and Hollar, U.S. Pat. No. 1,238,073 each disclose systems for alternatively supplying fuel from one of two fuel tanks to an internal combustion engine. Further, each of these patents discloses a three-way valve for selectively supplying the fuel from either of the two tanks to the engine.

Bucko, Sr. U.S. Pat. No. 4,078,579 discloses a three-way electrically operated valve.

As opposed to the cumbersome prior art methods and apparatus, the winterization procedure using the apparatus of the present invention requires merely the draining of the water tank and water heater, actuating, either electrically or manually, a pair of three-way valves to an anti-freeze position for automatically by-passing the water tank and water heater and supplying stored anti-freeze to the water lines, opening the lines and running the water pump. There is no spillage and there can be no leakage because none of the water lines were removed. This procedure uses approximately 15 minutes of unskilled labor which can be easily performed by the owner or user of the recreational vehicle.

SUMMARY OF THE INVENTION

An object of the present invention is to provide an improved anti-freeze protection apparatus adapted for use in recreational vehicle water systems.

Another object of the invention is to provide an anti-freeze protection apparatus which may be provided with either manual or electric controls for changing between a normal water supply state and an anti-freeze protection state.

A further object of the invention is to provide an anti-freeze protection apparatus which may be conveniently and inexpensively operated by the consumer, thereby substantially increasing the use and enjoyment of recreational vehicles during periods of below-freezing air temperatures.

Still another object of the invention is to provide an anti-freeze protection apparatus which utilizes a self-contained anti-freeze storage container.

A Still further object of the invention is to provide an anti-freeze protection apparatus which utilizes a three-way double-acting valve having a first inlet in fluid communication with a supply of anti-freeze and a second inlet in fluid communication with a supply of storage water, the two inlets being selectively coupled to an outlet in fluid communication with the inlet of a water pump.

Another object of the invention is to provide an anti-freeze protection apparatus which utilizes a three-way double-acting valve having a first outlet in fluid communication with a water heater inlet and a second outlet in fluid communication, a domestic hot water line, the two outlets being selectively coupled to an inlet in fluid communication with a pressurized storage water outlet of a water pump.

Still another object of the invention is to provide an anti-freeze protection apparatus which utilizes a three-way double-acting valve having a first outlet in fluid communication with a water heater inlet and a second outlet in fluid communication with a domestic hot water line, the two outlets being selectively coupled to an inlet in fluid communication with a pressurized storage water outlet of a water pump, the second outlet and domestic hot water line being in further fluid communication with the hot water outlet of the water heater, a check valve preventing the flow of fluid from the valve second outlet into the hot water outlet of the water heater.

More specifically, the present invention is directed to an anti-freeze apparatus for use with a recreational vehicle water system having a main storage tank, a water pump, a hot water heater and domestic hot and cold water supply lines. The improvement comprises an anti-freeze storage tank containing a supply of anti-freeze, a first valve mechanism in fluid communication with the anti-freeze storage tank and interposed between the water storage tank and the water pump and a second valve mechanism providing fluid communication between the water heater water inlet, the water heater hot water outlet and the domestic hot water line. The anti-freeze apparatus has a normal water supply state wherein the first valve mechanism permits water to flow from the storage tank to the water pump and the second valve mechanism permits pressurized storage water to flow to the water heater inlet and heated water to flow from the water heater outlet to the domestic hot water supply line; and an anti-freeze protection state, wherein the first valve mechanism prevents the flow of water from the storage tank and fluidly connects the supply of anti-freeze to the water pump, and the second valve mechanism prevents the flow of pressurized fluid to the water heater water inlet while directly connecting the pressurized storage water supply line to the domestic hot water supply line, thereby bypassing the water heater inlet, the check valve automatically preventing the flow of anti-freeze into said hot water heater through said hot water outlet, whereby anti-freeze is supplied to the entire water system except for the hot water heater and the water storage tank.

BRIEF DESCRIPTION OF THE DRAWINGS

These and other objects and advantages of the invention will become more fully apparent as the following description is read in conjunction with the drawings wherein.

DETAILED DESCRIPTION OF THE PREFERRED EMBODIMENT

Figure 1:
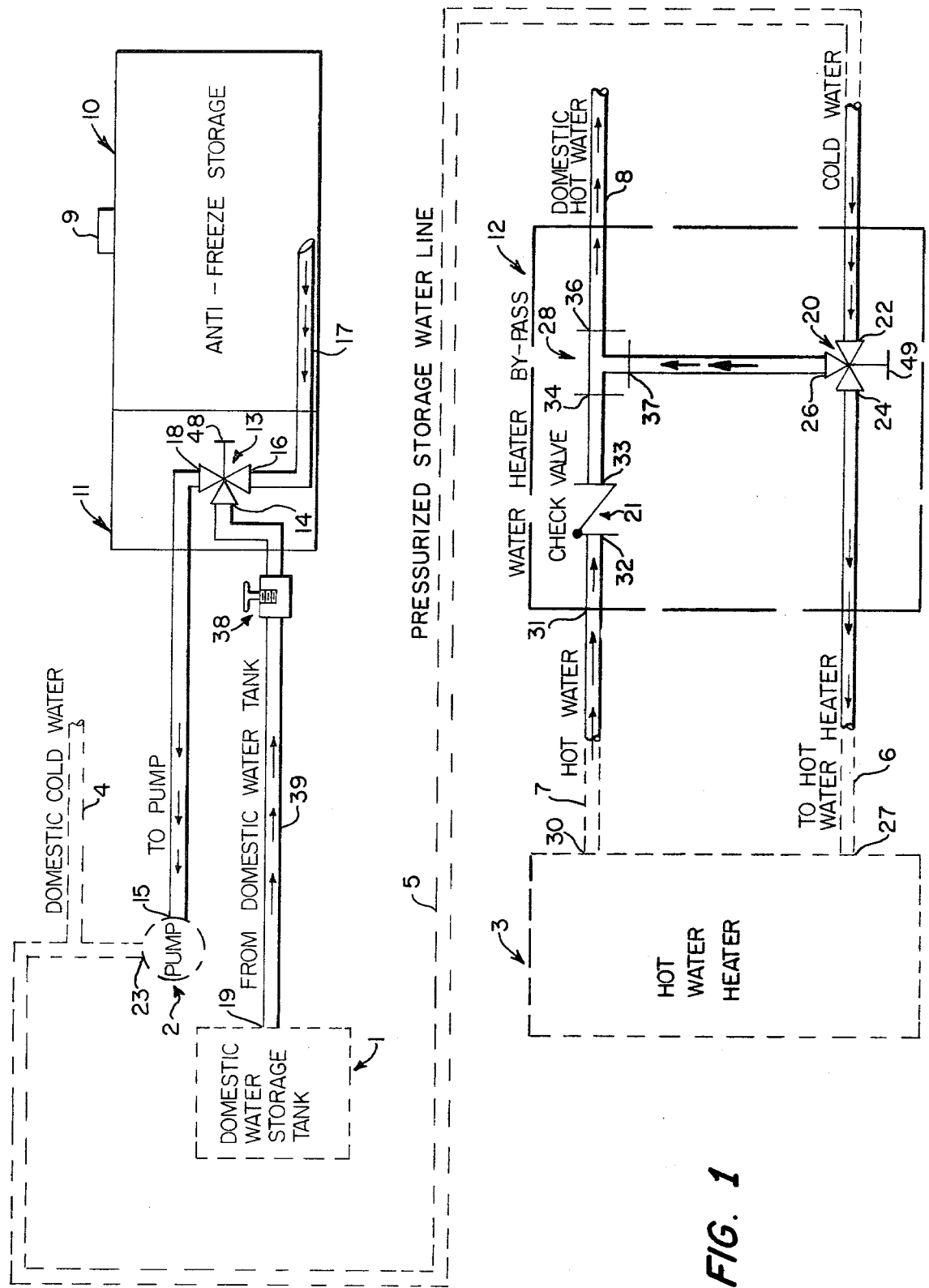
FIG. 1 is a schematic illustration of a preferred embodiment of the invention installed for purposes of illustration in a schematically illustrated recreational vehicle water system.

Referring now to the drawings, FIG. 1 schematically illustrates one embodiment of the anti-freeze apparatus of the present invention. The assist in giving a fuller appreciation of the invention, the anti-freeze apparatus is shown installed in a typical recreational vehicle-type water system. The invention, of course, would be equally suitable for use in modified forms of the illustrated water system.

Figure 2:
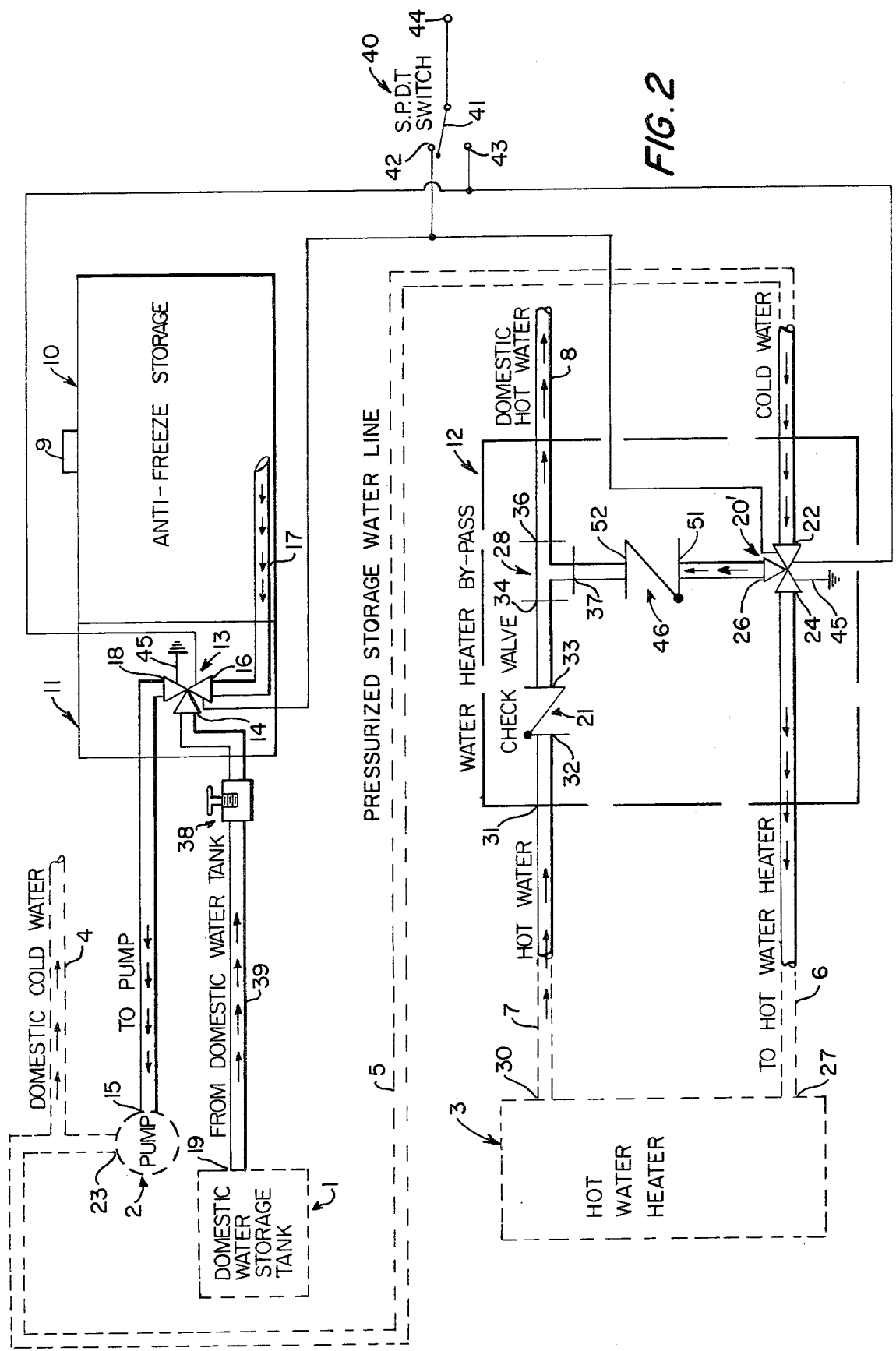
FIG. 2 is a schematic illustration of another preferred embodiment of the invention installed for purposes of illustration in a schematically illustrated recreational vehicle water system.

The typical recreational vehicle water system, as illustrated in FIGS. 1 and 2 in broken lines, comprises a domestic water storage tank 1, a water pump 2 in fluid communication with the water storage tank 1 and a hot water heater 3 in fluid communication with the water pump 2. Thus, the water pump 2 receives water from the water storage tank 1, either by gravity or suction and, in turn, supplies pressurized water to the hot water heater 3. Intermediate the water pump 2 and the hot water heater 3 is a domestic cold water line 4 for supplying pressurized cold or storage water to selected outlets placed throughout the recreational vehicle. The hot water heater includes an inlet 6 and an outlet 7. The water heater inlet 6 receives pressurized storage water from the water pump through the pressurized storage water supply line, while the water heater outlet 7 supplies pressurized hot water to a domestic hot water line 8 for distribution to outlets placed at selected locations throughout the recreational vehicle.

The invention comprises a freeze protection apparatus including an anti-freeze storage tank 10, a first valve mechanism 11 and a second mechanism 12.

Figure 3:
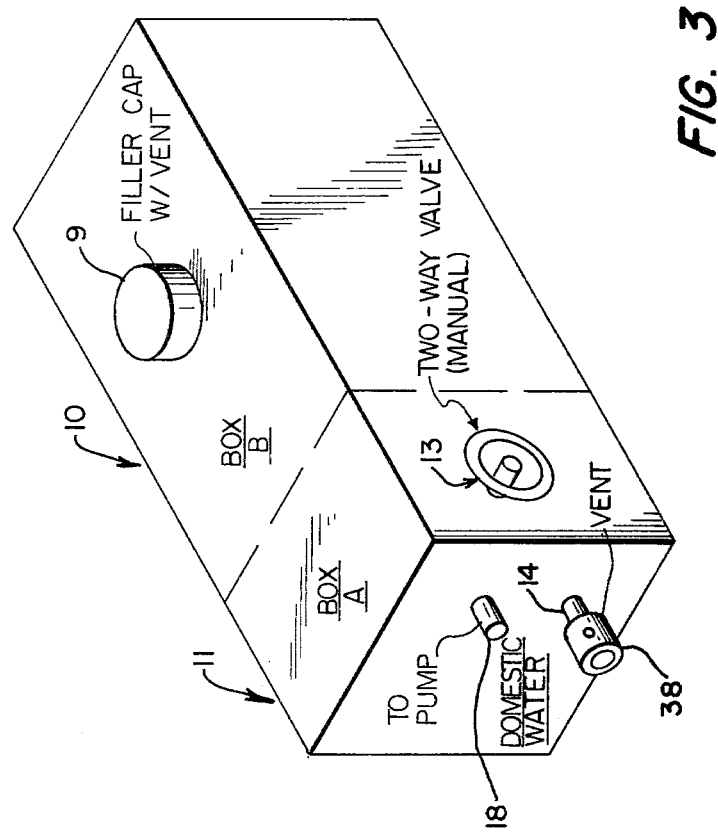
FIG. 3 is a perspective view of the first valve means and anti-freeze storage tank illustrated schematically in FIG. 1.

The anti-freeze storage tank and the first valve mechanism may be formed within a pair of joined molded plastic boxes. In one preferred configuration, as illustrated in FIG. 3, the anti-freeze storage box has dimensions of 7½"×11½"×6½" having a filter spout 9 on the top and a ½" female pipe thread port on the front lower left corner. When thus configured, the anti-freeze storage tank 10 has a capacity of approximately 2½ gallons. The first valve mechanism box 11 has dimensions of 1½"×4½"×6½".

The first valve mechanism is comprised of a three-way valve 13 having two inlets 14,16 and a single outlet 18. The first inlet 14 is adapted for connection to the outlet of the domestic water storage tank 19. The second inlet 16 is adapted for receiving anti-freeze from the anti-freeze storage compartment 10 through an inlet tube 17 lying along the bottom of the anti-freeze storage compartment 10. The valve outlet 18 is adapted for connection with the inlet 15 of the water pump 2.

Thus, the first valve mechanism 11 is interposed between the outlet 19 of the domestic water storage tank 1 and the inlet 15 of the water pump 2.

The second valve mechanism 12 is comprised of a three-way valve 20, check valve 46 and a check valve 21. The three-way valve 20 is comprised of two outlets 24,26 and one inlet 22. The inlet 22 is adapted for fluid connection with a pressurized water outlet 23 of the water pump 2. The first outlet 24 is adapted for fluid connection with an inlet 27 of the hot water heater 3. The second valve outlet 26 is adapted for connection with an inlet 51 of the check valve 46. An outlet 52 of the check valve 46 is adapted for connection with the domestic hot water line 8 through terminals 36 and 37 of a Tee coupling 28. The second valve mechanism 12 further includes a second inlet 31 in fluid connection with a hot water outlet 30 of the water heater 3. The discharge end of the second inlet 31 is in fluid tight connection with an inlet side 32 of the check valve 21, while an outlet side 33 of the check valve 21 is in fluid tight connection with one terminal 34 of the Tee coupling 28. Thus, the three terminals 34,36,37 of the Tee coupling 28 are in fluid tight connection with the outlet side 33 of the check valve 21, the domestic hot water line 8 and the check valve 46 from the second outlet 26 of the second valve mechanism 20, respectively.

Referring again to the first valve mechanism 11, it will be noted that a vent mechanism 38 is positioned in a supply line 39 communicating storage water from the domestic water storage tank 1 to the first valve mechanism first inlet 14. The purpose of the vent mechanism will be more fully described hereinbelow.

Each of the two three-way valves 13 and 20 are constructed so that an inner fluid control mechanism permits two of the three valve ports to be in fluid communication at any given time with the third valve port being shut off. More specifically, the first valve 13 is constructed such that the outlet 18 is at all times in fluid communication with either the inlet 14 or the inlet 16, the inlet not in fluid flow communication with the outlet 18 being shut off. Thus, fluid will either flow into inlet 14 and out through outlet 18 or fluid will flow in through inlet 16 and out through outlet 18. Similarly, the second valve 20 is constructed such that at all times fluid flowing into the inlet 22 will exit either through the outlet 24 or the outlet 26 with the outlet not in fluid flow communication with the inlet 22 being shut off. The flow of fluid into the inlets 14 or 16 and the outlets 24 or 26 are controlled by branching and blocking mechanisms within each of the valves 13 and 20 in any well-known manner. In the embodiment illustrated in FIG. 1, the fluid branching and blocking is controlled manually, such as by globe valves having manual actuators 48 and 49, while the embodiment illustrated in FIG. 2 utilizes soleniod actuated fluid branching and blocking mechanisms in each of the valve mechanisms 13' and 20'.

Referring now specifically to FIG. 2, an electric control apparatus 40 controlling the branching and blocking mechanisms within each of the solenoid controlled valves 13' and 20' includes a single pole double throw switch 40 having a movable contact element 41 and a pair of fixed contact elements 42,43. The movable contact element 41 is in electrical connection with a suitable voltage supply 44, for example, the recreational vehicle battery. Each of the solenoid actuation mechanisms for the respective valves 13' and 20' are grounded, for example, to a common vehicle chassis ground 45. Thus, when the movable contact element 41 is brought into contact with one or the other of the fixed contact elements 42,43 each of the valve mechanisms 13' and 20' is moved to one of the two fluid branching and blocking positions discussed herein above.

Referring now to the operation of the freeze protection apparatus, reference being had to FIG. 1, when the recreational vehicle is in use the water system is placed in a normal water supply state. The normal water supply state consists of positioning the fluid branching and blocking mechanism within the valve 13 such that water within the domestic water storage tank 1 flows from the water storage tank outlet 19 through the water line 39 into the inlet 14 and passes through the outlet 18 to the water pump inlet 15. The domestic water exits from the water pump outlet 23 under pressure created by the pump 2. Thus pressurized the water flows through the pressurized storage water line 5 and enters the inlet 22 of valve 20. The pressurized storage water continues through the valve 20 and exits from the outlet 24, passes through the water line 6 and enters the water inlet 27 of the hot water heater 3. After being heated within the hot water heater 3, the pressurized domestic hot water exits through the water heater hot water outlet 30. The pressurized hot water continues through the water line 7 entering the second valve mechanism inlet 31 where the water passes through the check valve 21 via the inlet 32 and outlet 33. The pressurized domestic hot water then passes through the Tee coupling 28 and enters the domestic hot water line 8. It will be noted that the pressurized domestic hot water cannot flow from the Tee coupling nipple 37 is blocked by the check valve 46 and further since the outlet 26 of the second valve mechanism 20 is blocked during normal water system usage. Also in the normal water supply state when hot water is in the hot water heater it causes a slightly higher pressure thus making valve 20' seal leak slightly because of back pressure from hot water heater. This is the reason for check valve 46.

The actuation of the freeze protection apparatus to the freeze protection state will now be described. That is, when below freezing temperatures are encountered and it is desired to protect the water system from damage due to freezing water, the freeze-protection apparatus of the invention is operated in the manner to be now described. The fluid branching and blocking mechanism within the valve 13 is actuated to assume a position such that the flow of water from the domestic water storage tank into the inlet 14 is blocked, and the inlet 16 in fluid connection with the anti-freeze storage container 10 is opened such that anti-freeze flows through the conduit 17 into the valve inlet 16 and passes through the valve outlet 18 and enters the water pump inlet 15. The anti-freeze exits from the water pump outlet 23 under pressure, flowing through the pressurized storage water line 5. The fluid branching and blocking mechanism within the second valve mechanism 20 is actuated such that the valve outlet 24 is blocked and the valve outlet 26 is opened. Therefore, the anti-freeze flows into the valve inlet 22 and passes out through the valve outlet 26, through check valve 46 and enters the Tee-coupling 28. The anti-freeze exits from the Tee-coupling terminal 36 and passes into the domestic hot water line 8. As already mentioned, the anti-freeze is prevented from entering the hot water heater inlet 27 by virtue of the valve outlet 24 being blocked. Further, the anti-freeze is prevented from entering the water heater through the hot water outlet 30 by virtue of the check valve 21 which prevents the reverse flow of fluid in the direction of the hot water outlet 30. It is to be understood, of course, that it is considered desirable that the domestic water storage tank 1 and the hot water heater 3 be drained prior to beginning the anti-freeze protection operation, and further, it is understood that all of the domestic hot and cold water outlets positioned along the domestic hot and cold water lines 8 and 4, respectively, should be opened so that anti-freeze can flow through the entire water system exiting from each of the domestic water outlets. The vent mechanism 38 is provided so that any water or air trapped within or adjacent to the first valve mechanism 13 can be drained and/or released. However, in a preferred arrangement of the present invention, the valve mechanism 13 is positioned higher than the domestic water storage tank. In this way, the valve 13 can be positioned within the box 11 such that trapped water can flow down through the water line 39 toward the domestic water storage tank 1. Further, it has been found that a small quantity of anti-freeze will drip from the valve inlet 14 in sufficient quantity to prevent any remaining traces of water within the water line 39 from freezing, thereby enabling deletion of the vent mechanism 38.

With regard to FIG. 2, it will be understood that the electrically actuated embodiment as illustrated therein, operates in substantially the same fashion as the manual embodiment illustrated in FIG. 1. That is, when the movable contact 41 is brought into contact with the fixed contact 42 electric current will flow, thus energizing the seleniod associated with first valve mechanism 13' and the solenoid associated with the second valve mechanism 20' such that the freeze protection system will assume the normal water operation state; while when the movable contact 41 is brought into contact with the fixed contact 43 the associated solenoid will cause the valve mechanisms 13' and 20' to assume the anti-freeze protection state. Further, the invention contemplates the use of solenoid control valves wherein when no voltage is applied to the solenoid control valves, the valves will assume the normal water operation state; whereas when a voltage is applied to the solenoid controlled valve mechanisms the valves will then assume the anti-freeze protection state. Thus, actuation of the freeze protection apparatus illustrated in FIG. 2 merely requires the draining of the domestic water storage tank 1 and the hot water heater 3, opening the domestic hot and cold water outlets, actuation of the electric switch 40 to bring the movable contact 41 into contact with the fixed contact 43 thereby energizing the respective solenoid mechanisms to cause the branching and blocking mechanisms within each of the valves 13' and 20' to assume the above-discussed anti-freeze protection position, and operating the water pump 2 to circulate anti-freeze throughout the water system, and finally, deactivating the water pump.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. In a recreational vehicle water system including:
(a) a main water storage tank containing a supply of water;
(b) a water pump having an inlet and an outlet, said inlet being in fluid communication with said supply of water in said main water storage tank and said outlet supplying pressurized storage water;
(c) a water heater, said water heater including a water inlet and a hot water outlet, said water inlet receiving pressurized storage water and said hot water outlet supplying hot water to a domestic hot water supply line;
(d) a cold water tap intermediate said water pump outlet and said water heater water inlet for supplying pressurized water to a domestic cold water supply line;
wherein the improvement comprises an improved anti-freeze apparatus for use in the water system comprising:
(e) an anti-freeze storage tank containing a supply of anti-freeze;
(f) a first three-way valve means in fluid communication with said anti-freeze storage tank and interposed between said water storage tank and said water pump;
(g) a second three-way valve means for providing fluid communication between said water pump outlet, said water heater inlet and said domestic hot water line, said second valve means including a check valve positioned between said water heater hot water outlet and said domestic hot water line;
wherein said water system has a normal water supply state and an anti-freeze protection state, in said normal water supply state said first valve means permits water to flow from said storage tank to said water pump and said second valve means permits pressurized storage water to flow to said water heater inlet; and
in said anti-freeze protection state said first valve means prevents the flow of storage water from said storage tank and fluidly connects said supply of anti-freeze to said water pump, and said second valve means prevents the flow of pressurized fluid to said water heater water inlet while connecting said pressurized storage water supply line to said domestic hot water supply line, thereby by-passing said water heater inlet, said check valve automatically preventing the flow of anti-freeze into said water heater through said hot water outlet, whereby anti-freeze is supplied to the entire water system except for said hot water heater and said water storage tank.

2. An improved anti-freeze system as claimed in claim 1 wherein each of said three-way valves is a manually actuated globe valve.

3. An improved anti-freeze system as claimed in claim 1 wherein each of said three-way valve is an electrically operated solenoid valve.

4. In a recreational vehicle water system including:
(a) a main cold water storage tank containing a supply of water;
(b) a water pump having an inlet and an outlet, said inlet being in fluid communication with said supply of water in said main water storage tank and said outlet supplying pressurized storage water to a pressurized storage water supply line;
(c) a hot water heater, said water heater including a water inlet and a pressurized hot water outlet, said water heater water inlet being in fluid communication with said pressurized storage water line and said hot water outlet supplying hot water to a domestic hot water supply line;
(d) a cold water tap intermediate said water pump outlet and said water heater water inlet for supplying domestic pressurized water to a domestic cold water supply line;
wherein the improvement comprises an improved anti-freeze apparatus for use in the water system comprising:
(e) an anti-freeze storage tank containing a supply of anti-freeze;
(f) a first three-way valve means, said first valve means including an anti-freeze inlet in fluid communication with said anti-freeze storage tank, a storage water inlet in fluid communication with said main water storage tank and a fluid outlet in fluid communication with said water pump inlet, said first valve means fluid outlet being adapted for alternate connection to either one of said anti-freeze or storage water inlets, for supplying one of said storage water or anti-freeze to said water pump inlet;
(g) a second three-way valve means, said second valve means including a first inlet in fluid communication with said water pump outlet, a first outlet in fluid communication with said water heater inlet, a second outlet in fluid communication with said domestic hot water supply line, said second outlet alternately supplying one of said pressurized hot water or pressurized anti-freeze to said domestic hot water supply line and a second inlet providing fluid communication between said water heater outlet and said second outlet; and a check valve positioned between said water heater hot water outlet and said second outlet, said check valve automatically preventing the flow of anti-freeze into said water heater hot water outlet when the water system is in an anti-freeze protection state;
wherein said water system has a normal water supply state and an anti-freeze protection state, in said normal water supply state said first valve means fluidly connects said storage water in said storage tank with said water pump inlet and said second valve means permits pressurized storage water to flow to said water heater inlet and hot water to flow from said water heater outlet to said domestic hot water supply line; and
in an anti-freeze protection state said first valve means blocks the flow of storage water while fluidly connecting said anti-freeze in said anti-freeze storage tank with said water pump inlet and said second valve means prevents the flow of anti-freeze in said pressurized storage water supply line to said water heater inlet while fluidly connecting said pressurized storage water supply line to said domestic hot water supply line, thereby by-passing said water heater, said check valve automatically preventing the flow of anti-freeze into said water heater through said hot water outlet whereby anti-freeze is supplied to the entire water system except for said hot water heater and said water storage tank.

5. An improved anti-freeze system as claimed in claim 4 wherein each of said three-way valves is a manually actuated globe valve.

6. An improved anti-freeze system as claimed in claim 4 wherein each of said three-way valves is an electrically operated solenoid valve.

* * * * *